(12) United States Patent
Wu et al.

(10) Patent No.: US 7,608,675 B2
(45) Date of Patent: Oct. 27, 2009

(54) ETHYLENE/METHYL ACRYLATE/CURE SITE COPOLYMERS AND COMPOUNDS AND VULCANIZATES THEREOF

(75) Inventors: Yun-Tai Wu, Bryn Mawr, PA (US); Mark Aaron Stewart, Wilmington, DE (US); Yi Ye, The Woodlands, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 372 days.

(21) Appl. No.: 11/479,039

(22) Filed: Jun. 30, 2006

(65) Prior Publication Data

US 2007/0004855 A1 Jan. 4, 2007

Related U.S. Application Data

(60) Provisional application No. 60/695,257, filed on Jun. 30, 2005.

(51) Int. Cl.
C08F 220/10 (2006.01)

(52) U.S. Cl. .................. 526/329; 526/328; 526/348; 524/556

(58) Field of Classification Search .............. 524/556; 525/166
See application file for complete search history.

(56) References Cited

U.S. PATENT DOCUMENTS

| 3,873,494 A | | 3/1975 | Lewis | |
|---|---|---|---|---|
| 3,883,472 A | | 5/1975 | Greene | |
| 3,904,588 A | | 9/1975 | Greene | |
| 4,275,180 A | | 6/1981 | Clarke | |
| 4,520,183 A | * | 5/1985 | Subramanian | 526/318 |
| 5,028,674 A | * | 7/1991 | Hatch et al. | 526/216 |
| 5,276,135 A | * | 1/1994 | Powell | 528/483 |
| 5,498,669 A | | 3/1996 | Williams | |
| 5,889,114 A | * | 3/1999 | Statz | 525/166 |
| 6,136,920 A | | 10/2000 | Hert | |
| 6,274,066 B1 | * | 8/2001 | Easter | 252/511 |
| 2005/0020775 A1 | | 1/2005 | Wu et al. | |

FOREIGN PATENT DOCUMENTS

| EP | 0 113 904 A2 | 7/1984 |
|---|---|---|
| JP | 11-343378 A | 12/1999 |
| JP | 2000-44757 A | 2/2000 |
| WO | WO 2005/010059 A | 2/2005 |

OTHER PUBLICATIONS

Hatzikiriakos: Polymer Engineering and Science, Nov. 2000, 40(11), 2279-2287.*
http://www.dupontelastomers.com/products/Vamac/Vamac.asp.*
http://www.dupontelastomers.com/products/Vamac/Vamac.asp, Published online on Oct. 16, 2007.*
PCT International Search Report for International application No. PCT/US2006/025154, dated Dec. 19, 2006.
PCT Partial International Search Report for International Application No. PCT/US2006/026085, dated Nov. 9, 2006.

* cited by examiner

*Primary Examiner*—David Wu
*Assistant Examiner*—Vu Nguyen

(57) ABSTRACT

Disclosed are copolymers derived from copolymerization of from about 50 to about 70 weight % of methyl acrylate; from about 0.5 to about 5 weight % of 1,4-butene-dioic acid moieties, or anhydrides or monoalkyl esters thereof; the remainder being ethylene, wherein the copolymer has a number average molecular weight from about 40,000 to about 65,000 and a melt index from about 1 to about 6 g/10 minutes. Also disclosed are compounded compositions comprising these copolymers, and cured compositions (i.e., vulcanizates) as well as rubber articles formed from these compounded compositions, such as hoses, dampers, boots, seals, and gaskets for automotive and nonautomotive applications. Blends of other polymers with these copolymers are also disclosed.

19 Claims, No Drawings

ETHYLENE/METHYL ACRYLATE/CURE SITE COPOLYMERS AND COMPOUNDS AND VULCANIZATES THEREOF

The application claims priority to U.S. provisional application No. 60/695,257, filed Jun. 30, 2005, the entire disclosure of which is incorporated herein by reference.

The invention relates to ethylene copolymers derived from ethylene, methyl acrylate, and an acid cure site comonomer. The invention also relates to compositions using the copolymers and to articles derived from these compositions.

BACKGROUND

The automotive and transportation industries use elastomeric (rubber-like) materials for a number of underhood or powertrain parts that require elastic properties such as gaskets, seals, hoses, dampers, etc. These parts require good heat and oil resistance. A number of synthetic polymeric materials have been provided for these applications. For example, U.S. Pat. Nos. 3,883,472 and 3,904,588 disclose ethylene/acrylic ester/butenedioic acid monoester terpolymers, compounds and vulcanizates thereof.

Trends in the automotive industry require the elastomeric materials used in making automotive parts to have wider ranges (both high and low) of service temperature capabilities and good fluid resistance to meet new performance demands. It is also desirable that these elastomers have improved dynamic fatigue resistance, especially at higher operating temperatures. Such a combination of properties and moderate cost are highly desired.

SUMMARY OF THE INVENTION

The invention provides copolymers, compounded compositions involving these copolymers, and vulcanizates. The copolymers are characterized by higher number average molecular weight and narrower molecular weight distribution (polydispersity) than similar previous copolymers. The vulcanizates exhibit improved dynamic fatigue resistance and heat resistance over previous terpolymer-derived vulcanizates.

This invention provides a composition comprising an ethylene copolymer derived from copolymerization of from about 50 to about 70 weight % of methyl acrylate; from about 0.5 to about 5 weight %, or about 1 to about 5 weight %, or about 1.5 to about 5 weight %, or about 1.5 to about 4 weight % or about 1.5 to about 3 weight % of a 1,4-butene-dioic acid or its derivative, wherein the derivative is an anhydride of the acid or a monoalkyl ester of the acid wherein the alkyl group in the monoalkyl ester has from 1 to about 6 carbon atoms, or combinations of two or more thereof; and ethylene being the remainder; and the copolymer has a number average molecular weight ($M_n$) from a lower limit of about 40,000, or about 43,000, to an upper limit of about 60,000 or about 65,000; has a melt index from about 1 to about 6 g/10 min; and preferably has a polydispersity from about 2 to about 5.5.

This invention also provides compound compositions (i.e., precursors to vulcanizates and herein referred to as compounded compositions or merely compounds) comprising the above copolymers and further comprising or produced from a curing agent and optionally one or more additives including an antioxidant, an internal release agent, a scorch retarder, a plasticizer, an accelerator, or a filler.

This invention also provides the compounded composition described above further comprising or produced from at least one additional polymer including a different ethylene alkyl acrylate copolymer, a polyacrylate copolymer, or combinations thereof.

This invention also provides vulcanizates comprising the above compounded compositions that are cured (for example at elevated temperatures and elevated pressures) for sufficient time to crosslink the copolymers, and optionally post-cured (for example at elevated temperature and ambient pressure) to further cure the vulcanizates.

This invention also provides an article comprising or produced from a composition that is as characterized as above or is the vulcanizate characterized as above wherein the article includes ignition wire jacketing, hoses, dampers, seals, gaskets, belts, spark plug boots, constant velocity joint boots, or shaft boots.

This invention also provides a process comprising contacting ethylene and methyl acrylate with a 1,4-butene-dioic acid or its derivative, wherein the derivative is an anhydride of the acid, monoalkyl ester of the acid, or combinations of two or more thereof under a condition effective to produce an ethylene copolymer; the methyl acrylate comprises about 50 to about 70 weight %, the acid or its derivative comprises about 0.5 to about 5 weight %, and the remainder is ethylene; the weight % is based on total weight of ethylene, methyl acrylate, and the acid or its derivative; and the condition includes a temperature from 120° C. to 185° C. or from 140° C. to 165° C., a pressure from about 1900 to 2810 kg/cm² (186 MPa to 267 MPa), or from 2065 to 2810 kg/cm², (196 to 267 MPa), and a feed temperature from 30° C. to 90° C. or from 50° C. to 90° C.

Also provided is the process characterized above further comprising combining the ethylene copolymer with a curing agent, optionally one or more additives, and optionally one or more additional polymers to produce a compounded composition; optionally forming the compounded composition into a desired shape and concurrently or sequentially curing and optionally post curing the compounded composition to produce a vulcanizate or article; wherein the additive includes an antioxidant, an internal release agent, a scorch retarder, a plasticizer, an accelerator, or a filler, or combinations of two or more thereof; the additional polymer includes ethylene alkyl acrylate copolymer, a polyacrylate copolymer, or combinations thereof; and the article includes ignition wire jacketing, hoses, dampers, seals, gaskets, belts, spark plug boots, constant velocity joint boots, or shaft boots.

This invention also provides compositions comprising the copolymer described above and further comprising or produced from a second polymer including thermosets such as epoxy resins or phenolic resins subject to further curing; or thermoplastics such as polyamides; optionally further comprising fillers, reinforcing fibers (continuous or noncontinuous, woven or nonwoven) or fibrous structures including pulps, or combinations of two or more thereof; optionally wherein the composition is further subjected to curing.

This invention also provides an article comprising or produced from this composition including printed circuit board, brake pad, or clutch facing, wherein the articles can be made using processes such as coating, laminating, molding, extruding, filament winding, calendering or combinations thereof, and subsequently curing.

This invention also provides the process characterized above further comprising combining the ethylene copolymer with a curing agent, one or more additional polymers including thermosets such as epoxy resins or phenolic resins subject to further curing or thermoplastics such as polyamides, and optionally one or more additives including filler, reinforcing fiber, fibrous structure of pulps, or combinations of two or more thereof to produce a compounded composition; and fabricating the compounded composition into an article; the article includes printed circuit board, brake pad, or clutch facing; and fabricating includes coating, laminating, molding, extruding, filament winding, calendering, or combinations of two or more thereof, and subsequently curing.

DETAILED DESCRIPTION OF THE INVENTION

All references disclosed herein are incorporated by reference.

This invention provides copolymers (terpolymers) comprising ethylene, methyl acrylate and an acid cure site, having higher number average molecular weight ($M_n$), lower melt index (MI) and preferably lower polydispersity than other polymers of the same comonomer proportions. The copolymers can be prepared by carrying out copolymerization at a combination of lower reactor temperature, higher reactor pressure, and higher feed temperature than described in U.S. Pat. Nos. 3,883,472 and 3,904,588. Preferably, the copolymers are random copolymers.

Polydispersity is defined as the weight-average molecular weight divided by the number average molecular weight ($M_w/M_n$ or PD). These molecular weight properties can be determined by using size exclusion chromatography.

"Copolymer" means polymers containing two or more different monomers and "terpolymer" means a copolymer comprising three comonomers.

The vulcanizates prepared from the copolymers provide improved dynamic flex fatigue resistance, as shown by a DeMattia test at high temperature (e.g. 150° C.). A DeMattia test ascertains the number of times a test sample can be repeatedly bent to produce cracking, leading to total failure. Higher molecular weight copolymers with a lower weight % of cure sites improve the heat resistance and further enhance high temperature dynamic fatigue resistance of the vulcanizates.

Of note is the ethylene copolymer comprising from 62 to 70 weight % of methyl acrylate. Also of note is the ethylene copolymer comprising from 50 to 62 weight % of methyl acrylate.

The acid cure sites comprise from about 0.5 to about 5 weight %, or about 1 to about 5 weight %, or about 1.5 to about 5 weight %, or about 1.5 to about 4 weight % or about 1.5 to about 3 weight %, of 1,4-butene-dioic acid moieties or anhydrides or monoalkyl esters thereof. Of note are acid cure sites that comprise a monoalkyl ester of 1,4-butene-dioic acid, in which the alkyl group of the ester has from 1 to 6 carbon atoms. The 1,4-butene-dioic acid and esters thereof exist in either cis or trans form, i.e. maleic acid or fumaric acid, prior to polymerization. Monoalkyl esters of either are satisfactory. Methyl hydrogen maleate, ethyl hydrogen maleate, propyl hydrogen maleate, butyl hydrogen maleate, or combinations of two or more thereof are particularly satisfactory as the acid cure site.

Ethylene is the third component in the terpolymer. As such, ethylene represents essentially the remainder of the copolymer relative to the required methyl acrylate and the 1,4-butene-dioic acid moiety or derivative thereof; i.e., polymerized ethylene is present in the copolymers in a complementary amount.

Examples of copolymers include copolymers of ethylene (E), methyl acrylate (MA) and methyl hydrogen maleate; copolymers of ethylene, methyl acrylate and ethyl hydrogen maleate; copolymers of ethylene, methyl acrylate and propyl hydrogen maleate; and copolymers of ethylene, methyl acrylate and butyl hydrogen maleate.

The copolymers can be prepared by copolymerizing ethylene, methyl acrylate and the cure site comonomer, such as a 1,4-butene-dioic acid monoalkyl ester, in the presence of a free-radical polymerization initiator, including for example peroxygen compounds or azo compounds.

The copolymerization may be run by continuously feeding ethylene, methyl acrylate, the acid cure site monomer (for example a monoalkyl ester of the acid), a free radical initiator, and optionally a solvent such as methanol or the like (see for example U.S. Pat. No. 5,028,674) to a stirred autoclave of the type disclosed in U.S. Pat. No. 2,897,183. Alternatively, other high-pressure reactor designs with sufficient mixing, residence time, temperature and pressure control, generally known in the art as autoclaves, operated either alone or in series with or without inter-stage cooling or heating, with multiple compartments and feed zones may be employed. Reactor dimensions such as volume, length and diameter may also influence operating conditions. The rate of conversion may depend on variables such as the polymerization temperature and pressure, monomer feed temperature, monomers employed, concentration of the monomers in the reaction mixture, and residence time for the desired yield and copolymer composition. It may be desirable to adjust the residence time and, in some cases, to use a telogen (chain transfer/chain terminating agent) such as propane to help adjust the molecular weight. The reaction mixture is continuously removed from the autoclave. After the reaction mixture leaves the reaction vessel, the copolymer is separated from the unreacted monomers and solvent (if solvent was used) by, for example, vaporizing the unpolymerized materials and solvent under reduced pressure and at an elevated temperature. The terms "feed temperature" and "monomer feed temperature" refer to the temperature at which the comonomers are controlled prior to their introduction into the reactor.

The copolymerization can be carried out in a pressurized reactor at elevated temperature, from 120° C. to 185° C., or from 140° C. to 165° C., and pressures of from 1900 to 2810 kg/cm$^2$, or from 2065 to 2810 kg/cm$^2$, with feed temperatures from 30° C. to 90° C., or from 50° C. to 90° C.

Appropriate peroxide initiators for the copolymerization process may depend on the reactor operating conditions, such as temperature and pressure, comonomers used, comonomer concentration, and inhibitors that are typically present in commercially available comonomers. The initiator can be employed neat as a liquid, dissolved or diluted in a suitable solvent such as odorless mineral spirits or mixed with another different initiator. Common classes of organic peroxides useful as free radical initiators include dialkyl peroxides, peroxy esters, peroxy dicarbonates, peroxy ketals, and diacyl peroxides. Examples of suitable peroxides include di(3,3,5-trimethyl hexanoyl) peroxide, tert-butyl peroxypivalate, tert-butyl peroxyneodecanoate, di(sec-butyl) peroxydicarbonate, and tert-amyl peroxyneodecanoate or combinations of two or more thereof. These and other suitable peroxides are available under the Luperox® tradename from Arkema or the Trigonox® tradename from Akzo Nobel. Similarly, suitable azo initiators may be used.

After the continuous operation has reached a steady state, the total per-pass conversion of monomers to polymer may vary from 5 to 25 weight %. The melt index (MI) of a copolymer may be roughly related to its molecular weight; the lower the MI the higher the molecular weight. The MI values are determined at 190° C. as described in ASTM test method D1238-01 (Procedure A, Condition 190/2.16). The copolymers have MI that vary, depending on polymerization conditions or the use of a telogen additive, typically but not limiting from about 1 to about 6 g/10 minutes. The percent by weight of the acid cure site monomer in the composition, for example an alkyl hydrogen maleate, can be determined by end-point titration using a phenolphthalein indicator (or the like) with a standardized methanolic caustic titre and a known weight of polymer dissolved in a heated/refluxed xylene/butanol mixture. The weight percent of methyl acrylate is determined by proton nuclear magnetic resonance (NMR) or Fourier-transform infrared (FTIR) analysis, after calibration by NMR.

The composition may contain some unreacted comonomer residuals, mainly of methyl acrylate. Removal of comonomer residuals is generally known in the art as a devolatilization or finishing step. For small laboratory scale preparations, devolatilization can be accomplished by heating in a vacuum oven for a period of time (for example, heating to 100° C. with a 635 mm Hg vacuum for four hours). For larger-scale preparations, the residuals can be removed by processing through a single or twin-screw extruder with vacuum ports at elevated temperature. Optionally, in finishing the copolymer a release agent (such as R2 listed in Table A) may be added at about 0.1 to 1 weight % in order to improve handling.

In the finishing operation, screw size and design and use of vacuum may impact the amount of copolymer that can be processed and may in turn impact the selection of the appropriate processing variables, including for example screw speed, residence time and temperature. One skilled in the art can design the appropriate processing variables to achieve a balance among these variables for preparation of suitable finished compositions. Adjusting finishing variables can impact the levels of residual monomers (i.e., free comonomers, measured by gas chromatography headspace analysis) present in the finished composition.

The finished ethylene copolymers described above are mixed with additional materials (a process known in the art as compounding) to provide a compounded composition that can be cured (a process known in the art as vulcanization) to provide a vulcanizate. The compositions can be compounded and cured according to the following procedures.

Compounding involves combining the finished copolymer with added ingredients such as cure agents, antioxidants, internal release agents, scorch retarders, plasticizers, accelerators, fillers and the like. Preferred and notable compounded compositions comprise the preferred and notable copolymers described above.

Optionally, the copolymers can be combined or blended with ethylene alkyl acrylate copolymers, including ethylene di- and terpolymers as generally known in the art (so-called AEM type materials); for example, an ethylene/methyl acrylate (E/MA) dipolymer or an ethylene/methyl acrylate/acid cure site terpolymer with number average molecular weight of less than 40,000, and the like; as well as in combination with polyacrylate copolymers, as generally known in the art (so-called ACM type materials); for example, ethyl acrylate/butyl acrylate/methoxyethyl acrylate/cure site and the like. Blends with AEM materials (e.g. ethylene/methyl acrylate/acid cure site with lower molecular weight) may provide improved processability such as green strength, collapse resistance or extrusion speed as well as improved dynamic fatigue resistance. Blends with polyacrylate ACM materials (e.g. ethyl acrylate/butyl acrylate/methoxyethyl acrylate, ethyl acrylate/butyl acrylate/cure site and the like) may provide improved processability.

The ingredients of the compound (including the copolymer, cure agents, additives, and/or additional polymers) can be mixed in known equipment such as an internal mixer (e.g., a Banbury mixer), a two-roll mill and other similar mixing devices known in the art to achieve a well-dispersed mixture.

After compounding, the compositions can be vulcanized. Preferred and notable vulcanized compositions comprise the preferred and notable copolymers and compounded compositions described above. A compound comprising the uncrosslinked (unvulcanized) copolymer and a curing agent optionally along with various fillers, other additives and/or polymers is subjected to a curing step at sufficient time, temperature and pressure to achieve covalent chemical bonding (i.e., crosslinking). Vulcanization involves curing the compounded composition at elevated temperature and elevated pressure for sufficient time to crosslink the copolymer (often referred to as press-curing in laboratory preparations), followed by an optional post-cure heating at ambient pressure to further cure the elastomer. For example, the vulcanizate may be formed and cured using known procedures at about 160° C. to about 200° C. for about 2 to 60 minutes. Post-cure heating is conducted at about 160° C. to about 200° C. for one to several hours.

Vulcanizing or curing agents that can be used with copolymers containing acid cure sites include di- and multi-functional amine curing systems, such as hexamethylenediamine carbamate (HMDAC), hexamethylenediamine (HMDA), triethylenetetramine, tetramethylene-pentamine, hexamethylenediamine-cinnamaldehyde adduct, and hexamethylenediamine dibenzoate salt. Aromatic amines can also be used as curing agents. Combinations of two or more curing agents may also be used. The curing agent(s) may be added neat or in an inert carrier. Methods for curing using aqueous HMDA are described in U.S. Pat. No. 7,001,957.

The vulcanization of acid cure site containing polymers can also include various vulcanization accelerators as generally known in the art. Representative accelerators include guanidine, arylguanidines, alkylguanidines or mixtures thereof. Example accelerators are tetramethylguanidine, tetraethylguanidine, diphenylguanidine and di-ortho-tolyl guanidine. The level of application of guanidine type accelerators is 1 to 6 parts per hundred (phr) of copolymer, preferably 3 to 5 phr. The preferred accelerators are diphenylguanidine (DPG) and di-ortho-tolyl guanidine (DOTG), or a combination thereof.

A curing process may use, for example, 1.25 parts of HMDAC and 4 parts DOTG (alternatively 2 parts DPG and 2 parts DOTG) per 100 parts by weight of the copolymer along with other ingredients being mixed in a Banbury-type internal mixer or on a roll mill followed by a curing step for 30 minutes at 180° C. at a pressure of about 84 kg/cm$^2$ (8.24 MPa) (see U.S. Pat. No. 3,904,588).

The vulcanizates may contain an antioxidant system typically based on, but not limited to a phosphorus ester antioxidant, a hindered phenolic antioxidant, an amine antioxidant, or a mixture of two or more of these compounds. The proportion of the antioxidant compound in the vulcanizing composition is 0.1 to 5 parts by weight per 100 parts of polymer, preferably about 0.5 to 2.5 parts by weight per 100 parts of polymer. The antioxidant improves the air heat aging of the vulcanizate. Below the lower limit of this range, the antioxidant effect may be low. The weight ratio of the phenolic or amine antioxidant to the phosphorus compound in mixtures can be about 0.5 to 3; preferably about 1.

The phosphorus ester can be for example, tri(mixed mono- and dinonylphenyl) phosphite, tris(3,5-di-t-butyl-4-hydroxyphenyl phosphate, high molecular weight poly(phenolic phosphonates), and 6-(3,5-di-t-butyl-4-hydroxy)benzyl-6H-dibenz-[c,c][1,2]oxaphosphorin-6-oxide, or combinations of two or more thereof.

Suitable hindered phenolic antioxidants can be, for example, 4,4'-butylidenebis(6-t-butyl-m-cresol), 1,3,5-trimethyl-2,4,6-tris-(3,5-di-t-butyl-4-hydroxybenzyl)benzene, 2,6-di-t-butyl-α-dimethylamino-p-cresol and 4,4'-thiobis-(3-methyl-6-t-butylphenol), or combinations of two or more thereof.

Amine antioxidants include, for example, polymerized 2,2,4-trimethyl-1,2-dehydroquinoline; N-phenyl-N'-(p-toluenesulfonyl)-p-phenylenediamine, N,N'-di(β-naphthyl)-p-phenylenediamine and 4,4'-bis(α,α-dimethylbenzyl)diphenylamine, or combinations of two or more thereof.

Antioxidant compositions can contain tri(mixed mono- and dinonylphenyl) phosphite mixed with either 4,4'-butylidenebis(6-t-butyl-m-cresol) or 4,4'-bis(α,α-dimethylbenzyl)diphenylamine. Particularly preferred antioxidant compositions contain 4,4'-bis(α,α-dimethylbenzyl)-diphenylamine (available commercially as Naugard® 445 from Chemtura).

Fillers can be used to reduce cost and to improve mechanical properties. A vulcanized composition may contain from 25 to 60 or 70 volume percent of fillers, alternatively from 30 to 120 or 150 parts of filler per hundred parts of polymer. Suitable fillers include, for example but not by way of limitation, carbon black, calcium carbonate, magnesium silicate or silica, notably carbon black. The preferred proportion can depend on the reinforcing effect of the filler used, which can be influenced by factors such as particle size of the filler.

Once cross-linked, the compositions described herein are not thermoplastic, per se, so articles may be prepared by forming the compound into the desired shape by molding or extrusion procedures and concurrently or subsequently curing the compound.

The vulcanizates can be used in a wide variety of automotive and nonautomotive articles, including ignition wire jacketing, spark plug boots, hoses, belts, miscellaneous molded boots, dampers, seals and gaskets. Hoses include but are not limited to turbocharger hoses, turbo diesel air cooler hoses, transmission oil cooler hoses, power steering hoses (low pressure), air conditioning hoses, air ducts, fuel line covers, and vent hoses. The vulcanizates are also useful for crankshaft torsional dampers and for noise management parts such as grommets.

The articles can be prepared by compounding the copolymer with added ingredients such as cure agents, antioxidants, internal release agents, scorch retarders, plasticizers, accelerators, fillers and the like and forming the composition into the desired shape by, for example, injection molding, compression molding or transfer molding. The compositions are held in the molds at elevated temperature and pressure for a period of time to initiate crosslinking (curing) and the shaped compositions are then removed from the molds and optionally heated at ambient pressure (post-curing) to continue the curing.

In some cases such as hoses, the compounded composition as described above can be formed into a shaped article by extrusion through an appropriately designed die. The initially-shaped article can be further shaped by forming with a mandrel while still pliable prior to curing. Hoses and tubing can be cured by treatment with super heated steam, hot air or hot inert gases such as nitrogen to provide the necessary heat and pressure.

Some articles may comprise elements in addition to the compositions as described herein. For example, articles (e.g. seals) may be prepared in which the composition of this invention is molded around a metal or plastic element. Other articles (e.g. hoses) can be extruded with reinforcing fibers, fiber structures or cording incorporated therein.

Although the copolymers are discussed herein primarily in terms of their use in compositions capable of forming elastomeric vulcanizates, they may also be used in other applications. Accordingly, this invention also provides compositions comprising the copolymers described above and further comprising or produced from a second polymer including thermosets such as epoxy resins or phenolic resins subject to further curing; or thermoplastics such as polyamides; optionally further comprising fillers, reinforcing fibers or fibrous structures such as pulps. Reinforcing fibers can be continuous or noncontinuous, woven or nonwoven. The fibers may be made of glass, carbon (graphite), para-aramids, meta-aramids, metal or mineral. Curing processes include, for example but not limited to, use of di- and multi-functional amine systems, with application of heat and optionally pressure.

The copolymers provide, for example but not limited to, toughening for polyamide compositions (for example, at less than 30 weight % of copolymer in the polyamide composition). Polyamides include those known in the art. Polyamides generally can be prepared from lactams or amino acids (e.g. nylon-6 or nylon-11), or prepared from condensation of diamines such as hexamethylenediamine with dibasic acids such as succinic, adipic, or sebacic acid. Copolymers and terpolymers of these polyamides are also included. Polyamides include polyepsiloncaprolactam (nylon-6), polyhexamethylene adipamide (nylon-66), nylon-11, nylon-12, nylon-12,12 and copolymers and terpolymers such as nylon-6/66, nylon-6/10, nylon-6/12, nylon-66/12, nylon-6/66/610 and nylon-6/6T, or combinations of two or more thereof. Notable polyamides are polyepsiloncaprolactam (nylon-6), polyhexamethylene adipamide (nylon-66), particularly nylon-6, or combinations thereof. In addition to the polyamides described above, other polyamides such as amorphous polyamides may also be used.

An article comprising or produced from compositions comprising the copolymer and further comprising at least one additional polymer can be made from processes such as coating, laminating, molding, extruding, filament winding, calendering or combinations thereof. Examples of such articles include printed circuit boards, brake pads, clutch facings and other articles fabricated from toughened thermosets.

While the invention has been particularly shown and described with reference to certain embodiments thereof, it may be understood by those skilled in the art that various changes in form and details may be made without departing from the spirit and scope of the invention. The following Examples are merely illustrative, and are not to be construed as limiting the scope of the invention described and/or claimed herein.

EXAMPLES

For example, a copolymer of this invention was produced in a high pressure pilot-scale autoclave reactor at a reactor temperature of 145° C. and a pressure of 2180 kg/cm$^2$ (214 MPa) with an ethylene feed rate of 11.34 kg/h, a methyl acrylate feed rate of 1.63 kg/h, an ethyl hydrogen maleate feed rate of 27.2 g/h, a methanol solvent feed rate of 435.5 g/h, and a propane telogen feed rate of 726 g/h at a feed temperature of 70° C. Di(sec-butyl) peroxydicarbonate (Luperox® 225 from Arkema) initiator was used, diluted to 10 volume % in odorless mineral spirits. This process provided a copolymer at a rate of 1.1 kg/h. The resulting terpolymer had 1.6 weight % ethyl hydrogen maleate and 60.9 weight % methyl acrylate with a melt index of 2.8 g/10 minutes and a polydispersity of 4.1, having 67% higher $M_n$ than the comparative examples in the Tables.

Additional Examples were prepared similarly, with reaction parameters summarized in the following Tables. In the Tables "- -" stands for no data. Amounts of comonomers in the final copolymer are indicated in weight %, unless indicated otherwise.

The molecular weights of the copolymers were determined by using the size exclusion chromatography (alternatively known as GPC, Gel Permeation Chromatography) technique common to the field. An integrated multi-detector size exclusion chromatography system, such as GPCV 2000™ from Waters Corporation (Milford, Mass.) was used. It was capable of keeping a constant temperature across the entire path of a polymer solution from the injector through detectors. Two differential on-line detectors were used in series, a refractive index detector and a capillary viscometer detector. There were four 8 mm×300 mm styrene-divinyl benzene columns in the system, for separation: two linear GPC KF806M, one GPC KF802 and one GPC KF-801, all from Shodex (Japan). The mobile phase was tetrahydrofuran stabilized with 0.05% butylated hydroxytoluene (J. T. Baker, Phillipsburg, N.J.). The columns were calibrated with a set of 10 narrow polydispersity (<1.1) polystyrene (PS) standards with peak molecular weights from 580 through 7,500,000 (Polymer Laboratories). Test samples were prepared by dissolving the polymer in mobile phase solvent at 40° C. with continuous moderate agitation without filtration (automatic sample preparation system PL 260™ from Polymer Laboratories, Church Stretton, UK). The sample was injected into the column and data collected. The operating conditions were: temperature, 40° C.; flow rate, 1.0 ml/min; injection volume, 0.219 ml; run time, 90 minutes. The data were analyzed with the software Empower™ 1.0 Chromatography Data Manager from Waters.

The copolymers were compounded with additional components including cure agents, accelerators, fillers, release aids, scorch retarders, antioxidants and plasticizers (see Table A below) according to the following general procedure.

The respective starting ingredients were mixed on a B or OOC size Banbury-type internal mixer using an upside-down mixing procedure and a dump temperature of 100° C. followed by further mixing on a two-roll mill at about 25° C. to achieve a homogeneous mixture. Amounts of components in the Tables hereafter are provided in parts per hundred (phr) of polymer.

TABLE A

|  | Material | Trade Name | Supplier |
|---|---|---|---|
| Release Aids/ Scorch Retarders | | | |
| R1 | Octadecyl Amine | Armeen ® 18D | Akzo Nobel |
| R2 | Complex Organic Phosphate Ester | Vanfre ® VAM | R. T. Vanderbilt |
| R3 | Stearic Acid | | |
| Anti-oxidants | | | |
| A1 | 4,4'-bis(α,α-dimethylbenzyl)-diphenylamine | Naugard ® 445 | Chemtura |
| Plasticizers | | | |
| P1 | Mixed Ether/Ester Plasticizer | TP ®-759 | Rohm & Haas |
| Fillers | | | |
| F1 | Carbon Black (FEF N-550) | | |
| Cure Systems | | | |
| CA1 | Hexamethylene Diamine Carbamate (HMDAC) | Diak ™ #1 | DuPont Performance Elastomers |
| CA2 | Di-ortho-tolyl Guanidine (DOTG) | | |
| CA3 | Diphenyl Guanidine (DPG) | | Swan |

Vulcanized slabs of 1.9 mm nominal thickness were prepared by curing the compounded composition for 5 to 10 minutes at 177° C. (or 180° C.) at a pressure of about 43.2 kg/cm$^2$ (4240 kPa) and then post-cured at 175° C. for one to four hours at ambient pressure. Slabs at 3 mm nominal thickness were prepared similarly.

Compression set testing was conducted according to ASTM D395-02. Heat aging testing was conducted according to ASTM D573-99. Mooney viscosity and Mooney scorch testing were conducted according to ASTM D1646-03. MDR testing was conducted according to ASTM D5289-95 (reapproved 2001). DeMattia testing at high temperature was conducted according to ASTM D430-95 Type 2 (reapproved 2000).

The following Examples illustrate materials comprising ethylene copolymers derived from ethylene, methyl acrylate and an additional acid cure site comonomer, having 54 to 62 weight % methyl acrylate. Unless noted otherwise, the compounds were vulcanized by being press cured for five minutes at 177° C. and post cured for 4 hours at 175° C. Vulcanizates prepared from the example terpolymers exhibited over 200 times better cycles to failure in a DeMattia test (at 150° C. on samples that were pre-heat aged 94 hours at 200° C. before testing) than lower molecular weight materials.

In Table 1, the Examples illustrate that lower reactor temperature, higher pressure and higher feed temperature were factors in raising molecular weight and lowering polydispersity compared to Comparative Example C101.

TABLE 1

| | Copolymer | | | |
|---|---|---|---|---|
| Reaction Conditions | C101 | 102 | 103 | 104 |
| Pressure (kg/cm$^2$) | 1900 | 2320 | 2320 | 2320 |
| Reactor Temperature (° C.) | 165 | 145 | 145 | 165 |
| Feed Temperature (° C.) | 10 | 10 | 75 | 10 |
| Mn divided by 1000 | 27.6 | 44.7 | 53.6 | 44.1 |
| Mw divided by 1000 | 235.1 | 336.3 | 234.8 | 267.0 |
| Polydispersity | 8.52 | 7.53 | 4.38 | 6.05 |
| MI | 31.8 | 1.5 | 1.8 | 4.6 |
| MA level | 53.9 | 57.0 | 55.8 | 55.8 |
| Cure site level | 4 | 4 | 4 | 4 |
| Compound | C111 | 112 | 113 | 114 |
| | Compounded Composition | | | |
| Copolymer | C101 | 102 | 103 | 104 |
| Amount of Copolymer, phr | 100 | 100 | 100 | 100 |
| A1 | 2 | 2 | 2 | 2 |
| R3 | 1.5 | 1.5 | 1.5 | 1.5 |
| R2 | 1.5 | 1.5 | 1.5 | 1.5 |
| R1 | 0.5 | 0.5 | 0.5 | 0.5 |
| F1 | 60 | 60 | 60 | 60 |
| P1 | 10 | 10 | 10 | 10 |
| CA1 | 1.5 | 1.5 | 1.5 | 1.5 |
| CA2 | 4 | 4 | 4 | 4 |
| Total phr | 181.0 | 181.0 | 181.0 | 181.0 |
| | Stock Properties | | | |
| MOONEY VISCOSITY, ML(1 + 4) at 100° C. | 28.7 | 121.7 | 221.7 | 99.2 |
| | Vulcanizate Properties | | | |
| Vulcanizate | C121 | 122 | 123 | 124 |
| Compound | C111 | 112 | 113 | 114 |
| 1) COMPRESSION SET, METHOD B, PLIED PELLETS | | | | |
| After 70 hours at 150° C. | 23.9 | 16.3 | 14.4 | 16.3 |
| 2) STRESS-STRAIN AND HARDNESS, ORIGINAL AT 23° C. | | | | |
| Hardness, Shore A, points | 67.7 | 66.4 | 66.7 | 66.6 |
| M 100%, MPa | 4.4 | 4.9 | 4.6 | 4.6 |
| Tb, MPa | 12.8 | 16.1 | 16.5 | 15.6 |
| Eb, % | 303 | 281 | 283 | 288 |
| Tear, Die C, kN/m | 35.9 | 35.5 | 34.0 | 36.1 |

The Examples in Tables 2 and 3 illustrate the effects of varying lower cure site levels with higher molecular weight for improved heat resistance. The heat resistance reported in the Tables is assessed by 1) accelerated heat aging (94 hours at 200° C.) followed by testing of tensile properties at room temperature; and 2) air heat aging according to ASTM D573-99. Comparative Example C201 was a commercially available AEM copolymer having lower molecular weight.

TABLE 2

| | Copolymer | | | |
|---|---|---|---|---|
| Reaction Conditions | C201 | 202 | 203 | 204 |
| Pressure (kg/cm$^2$) | — | 2320 | 2110 | 2110 |
| Reactor Temperature (° C.) | — | 145 | 165 | 145 |
| Feed Temperature (° C.) | — | 70 | 70 | 70 |
| Mn divided by 1000 | 37.2 | 59.2 | 46.3 | 51.7 |
| Mw divided by 1000 | 163 | 205 | 206 | 211 |
| Polydispersity | 4.38 | 3.47 | 4.44 | 4.09 |
| MI | 8 | 1 | 2.5 | 1.7 |
| MA level | 55.0 | 55.3 | 56.9 | 55.3 |
| Cure site level | 2.5 | 2.5 | 1.5 | 2.55 |
| Compound | C211 | 212 | 213 | 214 |
| | Compounded Copolymer | | | |
| Copolymer | C201 | 202 | 203 | 204 |
| Amount of Copolymer, phr | 100.5 | 100 | 100 | 100 |
| A1 | 2 | 2 | 2 | 2 |
| R3 | 1.5 | 1.5 | 1.5 | 1.5 |
| R2 | 1 | 1.5 | 1.5 | 1.5 |
| R1 | 0.5 | 0.5 | 0.5 | 0.5 |
| F1 | 50 | 50 | 50 | 50 |
| CA1 | 1.5 | 1.25 | 0.75 | 1.3 |
| CA2 | 4 | 4 | 4 | 4 |
| Total phr | 161.00 | 160.75 | 160.25 | 160.80 |
| | Stock Properties | | | |
| MOONEY VISCOSITY, ML(1 + 4) at 100° C. | 45.0 | >228 | 78.2 | >228 |
| | Vulcanizate Properties | | | |
| Vulcanizate | C221 | 222 | 223 | 224 |
| Compound | C212 | 212 | 213 | 214 |
| 1) COMPRESSION SET, METHOD B, PLIED PELLETS | | | | |
| After 70 hours at 150° C. | 23.5 | 16.3 | 30.6 | 17.2 |
| 2) STRESS-STRAIN AND HARDNESS, ORIGINAL AT 23° C. | | | | |
| Hardness, Shore A, points | 74.3 | 71.8 | 64.9 | 70.3 |
| M 100%, MPa | 4.7 | 4.7 | 2.8 | 5.0 |
| Tb, MPa | 17.3 | 18.0 | 15.2 | 18.7 |
| Eb, % | 376 | 321 | 576 | 334 |
| Tear, Die C, kN/m | 41.8 | 36.9 | 46.9 | 36.2 |
| 3) 23° C. STRESS AND STRAIN AFTER HEAT AGING 94 HOURS at 200° C. | | | | |
| Hardness, Shore A, Points | 81.6 | 76.5 | 71.9 | 75.8 |
| M 100%, MPa | 7.0 | 6.1 | 3.6 | 6.6 |
| Tb, MPa | 11.9 | 11.8 | 9.8 | 14.8 |
| Eb, % | 168 | 182 | 294 | 200 |
| 4) STRESS-STRAIN AND HARDNESS AFTER AGING 1 WEEK at 175° C. IN AIR | | | | |
| Hardness, Shore A, Points | 73.8 | 72.8 | 68.8 | 73.3 |
| M 100%, MPa | 5.2 | 4.8 | 3.1 | 5.2 |
| Tb, MPa | 15.8 | 16.5 | 11.9 | 16.0 |
| Eb, % | 366 | 358 | 556 | 301 |
| 5) STRESS-STRAIN AND HARDNESS AFTER AGING 1 WEEK at 180° C. IN AIR | | | | |
| Hardness, Shore A, Points | 77.5 | 72.8 | 66.8 | 73.2 |
| M 100%, MPa | 5.7 | 5.2 | 3.2 | 5.3 |
| Tb, MPa | 16.0 | 17.0 | 11.8 | 17.5 |
| Eb, % | 339 | 348 | 546 | 336 |
| 6) STRESS-STRAIN AND HARDNESS AFTER AGING 1 WEEK at 185° C. IN AIR | | | | |
| Hardness, Shore A, Points | 90 | 75.2 | 67.1 | 77.5 |
| M 100%, MPa | 6.1 | 5.5 | 3.1 | 6.1 |
| Tb, MPa | 13.5 | 15.6 | 10.4 | 15.5 |
| Eb, % | 219 | 282 | 389 | 263 |

TABLE 3

| Reaction Conditions | Copolymer | | | | | |
|---|---|---|---|---|---|---|
| | C201 | 302 | 303 | 304 | 305 | 306 |
| Pressure (kg/cm$^2$) | — | 2320 | 2110 | 2110 | 2110 | 2110 |
| Reactor Temperature (° C.) | — | 145 | 165 | 145 | 145 | 145 |
| Feed Temperature (° C.) | — | 70 | 70 | 70 | 70 | 70 |
| Mn divided by 1000 | 37.2 | 59.2 | 46.3 | 51.7 | 46.4 | 46.1 |
| Mw divided by 1000 | 163 | 205 | 206 | 211 | 203 | 200 |
| Polydispersity | 4.38 | 3.47 | 4.44 | 4.09 | 4.38 | 4.33 |
| MI | 8 | 1 | 2.5 | 1.7 | 2.1 | 2.1 |
| MA level | 55.0 | 55.3 | 56.9 | 55.3 | 55.7 | 55.1 |
| Cure site level | 2.5 | 2.5 | 1.6 | 2.6 | 1.5 | 2.0 |

| Compound | C311 | 312 | 313 | 314 | 315 | 316 |
|---|---|---|---|---|---|---|
| | Compounded Copolymer | | | | | |
| Copolymer | C201 | 302 | 303 | 304 | 305 | 306 |
| Amount of Copolymer, phr | 100.5 | 100 | 100 | 100 | 100 | 100 |
| A1 | 2 | 2 | 2 | 2 | 2 | 2 |
| R3 | 1.5 | 1.5 | 1.5 | 1.5 | 1.5 | 1.5 |
| R2 | 1 | 1.5 | 1.5 | 1.5 | 1.5 | 1.5 |
| R1 | 0 | 0.5 | 0.5 | 0.5 | 0.5 | 0.5 |
| F1 | 50 | 50 | 50 | 50 | 50 | 50 |
| CA1 | 1.25 | 1.25 | 0.8 | 1.25 | 0.8 | 1.0 |
| CA2 | 2 | 2 | 2 | 2 | 2 | 2 |
| CA3 | 2 | 2 | 2 | 2 | 2 | 2 |
| Total phr | 160.25 | 160.75 | 160.30 | 160.75 | 160.30 | 160.50 |
| | Stock Properties | | | | | |
| MOONEY VISCOSITY, ML(1 + 4) at 100° C. | 49.9 | >221.4 | 80.8 | 210.0 | >211.7 | >221.4 |

| | Vulcanizate Properties | | | | | |
|---|---|---|---|---|---|---|
| Vulcanizate | C321 | 322 | 323 | 324 | 325 | 326 |
| Compound | C311 | 312 | 313 | 314 | 315 | 316 |
| 1) COMPRESSION SET, METHOD B, PLIED PELLETS | | | | | | |
| After 70 hours at 150° C. | 26.8 | 20.7 | 45.3 | 22.9 | 44.4 | 30.0 |
| 2) STRESS-STRAIN AND HARDNESS, ORIGINAL AT 23° C. | | | | | | |
| Hardness, Shore A, points | 72.6 | 67.5 | 61.2 | 69.0 | 66.3 | 66.7 |
| M 100%, MPa | 4.0 | 3.9 | 2.5 | 4.5 | 2.6 | 3.2 |
| Tb, MPa | 17.3 | 19.4 | 13.4 | 18.8 | 14.4 | 15.5 |
| Eb, % | 452 | 386 | 577 | 354 | 579 | 417 |
| Tear, Die C, kN/m | 38.9 | 35.0 | 51.7 | 37.5 | 49.6 | 40.3 |
| 3) STRESS-STRAIN AND HARDNESS AFTER AGING 94 HOURS at 200° C. IN AIR, TESTED AT 23° C. | | | | | | |
| Hardness, Shore A, Points | 76.7 | 74.4 | 73.0 | 75.7 | 72.8 | 74.1 |
| M 100%, MPa | 5.2 | 4.8 | 3.0 | 5.4 | 3.1 | 3.9 |
| Tb, MPa | 10.1 | 10.8 | 7.2 | 10.6 | 7.2 | 9.9 |
| Eb, % | 184 | 201 | 278 | 178 | 265 | 252 |
| 4) STRESS-STRAIN AND HARDNESS AFTER AGING 1 WEEK at 175° C. IN AIR | | | | | | |
| Hardness, Shore A, Points | 74.8 | 69.6 | 67.2 | 71.2 | 69.0 | 70.9 |
| M 100%, MPa | 4.1 | 4.1 | 2.5 | 4.6 | 2.6 | 3.2 |
| Tb, MPa | 14.3 | 15.9 | 9.1 | 15.6 | 9.6 | 12.0 |
| Eb, % | 428 | 403 | 494 | 370 | 537 | 481 |
| 5) STRESS-STRAIN AND HARDNESS AFTER AGING 1 WEEK at 180° C. IN AIR | | | | | | |
| Hardness, Shore A, Points | 74.5 | 73.1 | 69.0 | 71.8 | 69.9 | 71.4 |
| M 100%, MPa | 4.6 | 4.4 | 2.7 | 5.0 | 2.7 | 3.6 |
| Tb, MPa | 14.8 | 16.5 | 9.4 | 16.1 | 10.0 | 12.4 |
| Eb, % | 376 | 369 | 478 | 337 | 497 | 411 |
| 6) STRESS-STRAIN AND HARDNESS AFTER AGING 1 WEEK at 185° C. IN AIR | | | | | | |
| Hardness, Shore A, Points | 75.4 | 72.3 | 70.0 | 73.7 | 69.6 | 71.6 |
| M 100%, MPa | 4.8 | 4.3 | 2.8 | 5.1 | 2.8 | 3.8 |
| Tb, MPa | 10.9 | 13.0 | 8.0 | 12.3 | 8.3 | 10.7 |
| Eb, % | 218 | 264 | 382 | 219 | 388 | 312 |

The Examples in Table 4 illustrate the evaluation of vulcanizates of this invention for high temperature dynamic fatigue resistance. The compound properties are shown in Table 4 and the dynamic fatigue resistance, as indicated by DeMattia testing, is summarized in Table 7.

TABLE 4

| Copolymer | | | |
|---|---|---|---|
| Reaction Conditions | C201 | 402 | 403 |
| Pressure (kg/cm²) | — | 2110 | 2110 |
| Reactor Temperature (° C.) | — | 145 | 145 |
| Feed Temperature (° C.) | — | 70 | 70 |
| Mn divided by 1000 | 37.2 | 46.4 | 46.1 |
| Mw divided by 1000 | 163 | 203 | 200 |
| Polydispersity | 4.38 | 4.38 | 4.33 |
| MI | 8 | 2.5 | 2.2 |
| MA level | 55.0 | 55.7 | 55.1 |
| Cure site level | 2.5 | 1.4 | 1.98 |
| Compound | C411 | 412 | 413 |
| Compounded Copolymer | | | |
| Copolymer | C201 | 402 | 403 |
| Amount of copolymer, phr | 100.5 | 100 | 100 |
| A1 | 2 | 2 | 2 |
| R3 | 1.5 | 1.5 | 1.5 |
| R2 | 1 | 1.5 | 1.5 |
| R1 | 0 | 0.5 | 0.5 |
| F1 | 50 | 50 | 50 |
| CA1 | 1.25 | 1.05 | 0.83 |
| CA2 | 2 | 2 | 2 |
| CA3 | 2 | 2 | 2 |
| Total phr | 160.25 | 160.55 | 160.33 |
| Stock Properties | | | |
| MOONEY VISCOSITY, ML(1 + 4) at 100° C. | 43.8 | 83.5 | 100.1 |
| MOONEY SCORCH, MS at 121° C. | | | |
| Minimum, mu | 14.0 | 34.7 | 44.2 |
| t(3), min | 9.74 | 8.37 | 5.05 |
| t(10), min | 18.03 | — | 8.15 |
| t(18), min | >20 | >20 | 13.87 |
| MDR at 177° C./0.5 degrees/20 minutes | | | |
| ML, dNm | 0.52 | 1.18 | 1.37 |
| MH, dNm | 9.00 | 6.46 | 6.92 |
| ts2, min | 1.53 | 2.43 | 1.64 |
| t(50), min | 2.79 | 2.91 | 2.05 |
| t(90), min | 12.05 | 10.61 | 10.59 |
| Vulcanizate Properties | | | |
| Vulcanizate | C421 | 422 | 423 |
| Compound | C411 | 412 | 413 |
| 1) COMPRESSION SET, METHOD B, PLIED PELLETS | | | |
| After 70 hrs. at 150° C. | 43.5 | 49.3 | 46.1 |
| 2) STRESS-STRAIN AND HARDNESS, ORIGINAL AT 23° C. | | | |
| Hardness, Shore A, points | 69.4 | 66.0 | 65.0 |
| M 100%, MPa | 3.9 | 3.0 | 2.9 |
| Tb, MPa | 16.3 | 16.2 | 15.8 |
| Eb, % | 440 | 543 | 537 |
| Tear, Die C, kN/m | 38.9 | 42.2 | 45.9 |
| 3) STRESS-STRAIN AND HARDNESS AFTER AGING 94 HOURS at 200° C. IN AIR, TESTED AT 23° C. | | | |
| Hardness, Shore A, Points | 73.9 | 70.4 | 68.6 |
| M 100%, MPa | 5.1 | 3.4 | 3.5 |
| Tb, MPa | 11.9 | 11.0 | 11.0 |
| Eb, % | 233 | 328 | 313 |

TABLE 4-continued

| 4) STRESS-STRAIN AND HARDNESS AFTER AGING 1 WEEK at 175° C. IN AIR | | | |
|---|---|---|---|
| Hardness, Shore A, Points | 74.8 | 69.2 | 69.6 |
| M 100%, MPa | 4.5 | 3.5 | 3.5 |
| Tb, MPa | 15.1 | 13.0 | 12.6 |
| Eb, % | 440 | 539 | 524 |
| 5) STRESS-STRAIN AND HARDNESS AFTER AGING 1 WEEK at 180° C. IN AIR | | | |
| Hardness, Shore A, Points | 75.8 | 68.4 | 69.7 |
| M 100%, MPa | 4.7 | 3.3 | 3.1 |
| Tb, MPa | 12.8 | 10.6 | 10.1 |
| Eb, % | 308 | 443 | 419 |

The Examples in Table 5 are high molecular weight copolymers with cure site levels lower than two weight %. The tensile properties of vulcanizates after accelerated heat aging at 200° C., and long-term heat aging properties at 165, 170 and 175° C. are reported in Table 5 and dynamic fatigue resistance testing (DeMattia) are shown in Table 8.

TABLE 5

| Copolymer | | | | | |
|---|---|---|---|---|---|
| Reaction Conditions | C201 | 502 | 503 | 504 | 505 |
| Pressure (kg/cm²) | — | 2180 | 2180 | 2180 | 2110 |
| Reactor Temperature (° C.) | — | 155 | 155 | 145 | 145 |
| Feed Temperature (° C.) | — | 50 | 70 | 70 | 70 |
| Mn divided by 1000 | 37.2 | 40.0 | 46.3 | 47.1 | 46.1 |
| Mw divided by 1000 | 163 | 198 | 159 | 193 | 200 |
| Polydispersity | 4.38 | 4.94 | 3.45 | 4.09 | 4.33 |
| MI | 8 | 4.7 | 5.8 | 2.8 | 1.9 |
| MA level | 55.0 | 59.5 | 58.9 | 60.9 | 55.1 |
| Cure site level | 2.5 | 1.70 | 1.80 | 1.63 | 1.86 |
| Compound | C511 | 512 | 513 | 514 | 515 |
| Compounded Copolymer | | | | | |
| Copolymer | C201 | 502 | 503 | 504 | 505 |
| Amount of Copolymer, phr | 100.5 | 100 | 100 | 100 | 100 |
| A1 | 2 | 2 | 2 | 2 | 2 |
| R3 | 1 | 1.5 | 1.5 | 1.5 | 1.5 |
| R2 | 1.5 | 1.5 | 1.5 | 1.5 | 1.5 |
| R1 | 0 | 0.5 | 0.5 | 0.5 | 0.5 |
| F1 | 50 | 50 | 50 | 50 | 50 |
| CA1 | 1.25 | 0.85 | 0.90 | 0.82 | 0.93 |
| CA2 | 2 | 2 | 2 | 2 | 2 |
| CA3 | 2 | 2 | 2 | 2 | 2 |
| Total phr | 160.25 | 160.35 | 160.40 | 160.32 | 160.43 |
| Stock Properties | | | | | |
| MOONEY VISCOSITY, ML(1 + 4) at 100° C. | 47.2 | 62.0 | 64.0 | 78.3 | 91.1 |
| MOONEY SCORCH, MS at 121° C. | | | | | |
| Minimum, mu | 16.4 | 23.6 | 25.1 | 32.3 | 40.4 |
| t(3), min. | 9.58 | 10.05 | 8.46 | 7.54 | 5.65 |
| t(10), min. | 18.02 | >20 | 17.84 | 14.64 | 8.89 |
| t(18), min. | >20 | >20 | >20 | >20 | 14.21 |
| MDR at 177° C./0.5 degrees/20 minutes | | | | | |
| ML, dNm | 0.54 | 0.78 | 0.80 | 1.07 | 1.30 |
| MH, dNm | 9.28 | 4.82 | 5.56 | 5.36 | 8.06 |

TABLE 5-continued

|  |  |  |  |  |  |
|---|---|---|---|---|---|
| ts2, min. | 1.51 | 3.07 | 2.47 | 2.75 | 1.38 |
| t(50), min. | 2.77 | 2.66 | 2.62 | 2.58 | 2.04 |
| t(90), min. | 11.33 | 11.04 | 11.02 | 10.51 | 9.77 |
| Vulcanizate Properties |  |  |  |  |  |
| Vulcanizate | C521 | 522 | 523 | 524 | 525 |
| Compound | C511 | 512 | 513 | 514 | 515 |
| 1) COMPRESSION SET, METHOD B, PLIED PELLETS |  |  |  |  |  |
| After 70 hrs. at 150° C. | 33.0 | 49.1 | 44.5 | 46.7 | 34.6 |
| 2) STRESS-STRAIN AND HARDNESS, ORIGINAL AT 23° C. |  |  |  |  |  |
| Hardness, Shore A, points | 67.8 | 65.3 | 65.6 | 65.2 | 64.1 |
| M 100%, MPa | 4.33 | 3.0 | 3.1 | 2.9 | 3.5 |
| Tb, MPa | 17.5 | 13.8 | 14.7 | 14.5 | 17.5 |
| Eb, % | 459 | 620 | 592 | 604 | 532 |
| Tear, Die C, kN/m | 45.5 | 46.6 | 46.0 | 54.6 | 45.2 |
| 3) STRESS-STRAIN AND HARDNESS AFTER AGING 94 HOURS at 200° C. IN AIR TESTED AT 23° C. |  |  |  |  |  |
| Hardness, Shore A, Points | 77.0 | 70.4 | 73.6 | 69.0 | 68.7 |
| M 100%, MPa | 5.6 | 3.3 | 3.8 | 2.9 | 3.8 |
| Tb, MPa | 12.4 | 9.2 | 10.0 | 9.8 | 12.1 |
| Eb, % | 218 | 311 | 298 | 396 | 295 |
| 4A) STRESS-STRAIN AND HARDNESS AFTER AGING 1 WEEK at 165° C. IN AIR |  |  |  |  |  |
| Hardness, Shore A, Points | 72.0 | 68.9 | 70.5 | 67.4 | 67.8 |
| M 100%, MPa | 4.3 | 2.9 | 3.1 | 2.7 | 3.2 |
| Tb, MPa | 15.5 | 10.4 | 11.8 | 11.0 | 14.4 |
| Eb, % | 431 | 607 | 564 | 625 | 547 |
| 4B) STRESS-STRAIN AND HARDNESS AFTER AGING 6 WEEKS at 165° C. IN AIR |  |  |  |  |  |
| Hardness, Shore A, Points | 83.8 | 76.0 | 76.7 | 79.1 | 74.9 |
| M 100%, MPa | — | 5.8 | 6.0 | 5.8 | 6.7 |
| Tb, MPa | 8.1 | 8.0 | 7.4 | 6.9 | 7.1 |
| Eb, % | 84 | 126 | 130 | 131 | 113 |
| 5A) STRESS-STRAIN AND HARDNESS AFTER AGING 1 WEEK at 170° C. IN AIR |  |  |  |  |  |
| Hardness, Shore A, Points | 74.2 | 67.1 | 70.5 | 69.5 | 67.4 |
| M 100%, MPa | 4.4 | 2.9 | 3.4 | 3.0 | 3.4 |
| Tb, MPa | 15.8 | 10.7 | 11.9 | 11.2 | 14.7 |
| Eb, % | 446 | 598 | 588 | 648 | 558 |
| 5B) STRESS-STRAIN AND HARDNESS AFTER AGING 6 WEEKS at 170° C. IN AIR |  |  |  |  |  |
| Hardness, Shore A, Points | 81.2 | 77.6 | 77.8 | 76.4 | 75.5 |
| M 100%, MPa | — | 5619 | 5336 | 4812 | 5922 |
| Tb, MPa | 8.7 | 7.2 | 7.2 | 7.2 | 8.1 |
| Eb, % | 99 | 138 | 149 | 164 | 142 |
| 6) STRESS-STRAIN AND HARDNESS AFTER AGING 3 WEEKS at 175° C. IN AIR |  |  |  |  |  |
| Hardness, Shore A, Points | 75.4 | 70.4 | 71.2 | 70.2 | 70.7 |
| M 100%, MPa | 5.4 | 3.2 | 2.9 | 3.0 | 3.7 |
| Tb, MPa | 10.7 | 7.2 | 7.8 | 7.3 | 9.4 |
| Eb, % | 207 | 291 | 295 | 314 | 266 |

The Examples in Table 6 are selected copolymers that confirm the improved high temperature dynamic fatigue resistance. Vulcanization conditions for the ASTM testing slabs were: press cure at 180° C. for 5 minutes, then post cure at 175° C. for 4 hours. Static heat aging properties of the vulcanizates are shown in Table 6 and high temperature dynamic fatigue resistance testing (DeMattia) is shown in Table 9.

TABLE 6

| Copolymer |  |  |  |  |
|---|---|---|---|---|
| Reaction Conditions | C201 | 602 | 603 | 604 |
| Pressure (kg/cm²) | — | 2180 | 2180 | 2110 |
| Reactor Temperature (° C.) | — | 155 | 145 | 145 |
| Feed Temperature (° C.) | — | 70 | 70 | 70 |
| Mn divided by 1000 | 37.2 | 46.3 | 47.1 | 46.1 |
| Mw divided by 1000 | 163 | 159 | 193 | 200 |
| Polydispersity | 4.38 | 3.45 | 4.09 | 4.33 |
| MI | 8 | 5.8 | 2.8 | 1.8-2.0 |
| MA level | 55.0 | 58.9 | 60.9 | 55.1 |
| Cure site level | 2.5 | 1.80 | 1.63 | 1.86 |
| Compound | C611 | 612 | 613 | 614 |
| Compounded Copolymer |  |  |  |  |
| Copolymer | C201 | 602 | 603 | 604 |
| Amount of Copolymer, phr | 100 | 100 | 100 | 100 |
| F1 | 50 | 50 | 50 | 50 |
| A1 | 2 | 2 | 2 | 2 |
| R1 | — | 0.5 | 0.5 | 0.5 |
| R3 | 1.5 | 1.5 | 1.5 | 1.5 |
| R2 | 1 | 1 | 1 | 1 |
| CA3, 80% in inert carrier | 2.5 | 2.5 | 2.5 | 2.5 |
| CA2 | 2 | 2 | 2 | 2 |
| CA1 | 1.25 | 0.90 | 0.82 | 0.93 |
| Total phr | 160.25 | 160.40 | 160.32 | 160.43 |
| Stock Properties |  |  |  |  |
| MOONEY VISCOSITY, ML(1 + 4) at 100° C. | 46.4 | 58.6 | 70.1 | 87.7 |
| MOONEY SCORCH, TS2 at 121° C. | 7.15 | 7 | 7.28 | 5 |
| MDR at 180° C./0.5 deg/12 min |  |  |  |  |
| ML, dNm | 0.45 | 0.69 | 0.89 | 1.27 |
| MH, dNm | 8.62 | 5.3 | 5.09 | 8.05 |
| ts1, min | 0.78 | 0.95 | 1.01 | 0.67 |
| Ts2, min | 1.14 | 1.63 | 1.8 | 0.99 |
| tc10, min | 0.72 | 0.64 | 0.63 | 0.58 |
| tc50, min | 1.98 | 1.88 | 1.9 | 1.54 |
| tc90, min | 5.83 | 5.55 | 5.59 | 4.46 |
| Vulcanizate Properties |  |  |  |  |
| Vulcanizate | C621 | 622 | 623 | 624 |
| Compound | C611 | 612 | 613 | 614 |
| 1) COMPRESSION SET, METHOD B, PLIED PELLETS |  |  |  |  |
|  | 37 | 44 | 53 | 36 |
| 2) STRESS-STRAIN AND HARDNESS, ORIGINAL AT 23° C. |  |  |  |  |
| Hardness, Shore A, Points | 68 | 65 | 66 | 65 |
| M 100%, MPa | 3.8 | 2.8 | 2.6 | 3.5 |
| Tb, MPa | 17.6 | 14.9 | 14.6 | 17.6 |
| Eb, % | 485 | 617 | 668 | 534 |
| Tear Crescent Die C, kN/m | 29.4 | 32.0 | 30.6 | 30.9 |

Tables 7 through 9 summarize DeMattia dynamic fatigue resistance testing at 150° C. Samples for the DeMattia testing were prepared by molding the compounded composition into test coupons for 10 to 20 minutes at 177° C. to 180° C. at a pressure of about 43.2 kg/cm² (4240 kPa) and then post-curing at 175° C. for four hours at ambient pressure.

Table 7 illustrates vulcanizates from Table 4, after aging in air for 94 hours at 200° C., showing improved dynamic fatigue resistance.

TABLE 7

| Vulcanizate | Number of Cycles to reach a total failure | | |
|---|---|---|---|
| | C421 | 422 | 423 |
| median of 6 samples | 92 | 297 | 469 |

Table 8 illustrates a DeMattia test on non-heat aged vulcanizates from Table 5.

TABLE 8

| Vulcanizate | Number of Cycles to reach a total failure | | | | |
|---|---|---|---|---|---|
| | C521 | 522 | 523 | 524 | 525 |
| median of 6 samples | 320 | 51235 | 51200 | 20480 | 1280 |

Table 9 illustrates DeMattia testing of vulcanizates from Table 6, after aging 94 hours at 200° C. The results of Table 8 and Table 9 indicate a that greater than 100-fold increase in dynamic fatigue resistance under this testing condition can be achieved.

TABLE 9

| Vulcanizate | Number of Cycles to reach a total failure | | | |
|---|---|---|---|---|
| | C621 | 622 | 623 | 624 |
| median of 6 samples | 5 | 640 | 1920 | 40 |

Having thus described and exemplified the invention with a certain degree of particularity, the following claims are not to be so limited but are to be afforded a scope commensurate with the wording of each element of the claim and equivalents thereof.

The invention claimed is:

1. A composition comprising an ethylene copolymer having an acid cure site wherein the copolymer is derived from copolymerization of ethylene, about 50 to about 70 weight % of methyl acrylate, and about 0.5 to about 5 weight % of an acid cure site monomer or its derivative wherein the acid is 1,4-butene-dioic acid; the derivative is an anhydride of the acid, a monoalkyl ester of the acid, or combinations thereof; the alkyl group in the monoalkyl ester has from 1 to about 6 carbon atoms, or combinations of two or more thereof; and the copolymer has a number average molecular weight (Mn) from about 40,000 to about 65,000 and a melt index from about 1 to about 6 g/10 minutes.

2. The composition of claim 1 wherein the acid cure site comprises methyl hydrogen maleate, ethyl hydrogen maleate, propyl hydrogen maleate, butyl hydrogen maleate, or combinations of two or more thereof.

3. The composition of claim 1 further comprising a curing agent, one or more additives, or combinations thereof wherein the additive includes an antioxidant, an internal release agent, a scorch retarder, a plasticizer, an accelerator, or a filler and the composition is optionally a cured or post-cured composition.

4. The composition of claim 1 further comprising at least one additional polymer, a curing agent, an additive, or combinations of two or more thereof wherein the additive includes an antioxidant, an internal release agent, a scorch retarder, a plasticizer, an accelerator, or a filler; the additional polymer includes an ethylene alkyl acrylate copolymer, a polyacrylate copolymer, or combinations thereof and optionally the composition is a cured or post-cured composition.

5. The composition of claim 1 comprising a curing agent, a second polymer, and optionally an additive wherein the second polymer includes a thermoset, a thermoplastic, or combinations thereof; the additive includes filler, reinforcing fiber, fibrous structure, or combinations of two or more thereof; the thermoset includes an epoxy resin, a phenolic resin, or combinations thereof; and optionally the composition is a cured composition.

6. The composition of claim 1 wherein the copolymer is derived from about 1 to about 5 weight % of the acid cure site monomer or its derivative; and has a polydispersity from about 2 to about 5.5.

7. The composition of claim 1 wherein the copolymer is derived from about 1 to about 3 weight % of the acid cure site monomer or its derivative and has a polydispersity from about 2 to about 5.5.

8. The composition of claim 7 wherein the acid cure site comprises methyl hydrogen maleate, ethyl hydrogen maleate, propyl hydrogen maleate, butyl hydrogen maleate, or combinations of two or more thereof.

9. The composition of claim 7 further comprising a curing agent, an additive, and optionally an additional polymer wherein the additive includes an antioxidant, an internal release agent, a scorch retarder, a plasticizer, an accelerator, or a filler; the additional polymer includes an ethylene alkyl acrylate copolymer, a polyacrylate copolymer, or combinations thereof; and optionally the composition is a cured or post-cured composition.

10. The composition of claim 7 further comprising a curing agent, a second polymer, and optionally an additive wherein the second polymer includes thermoset or a thermoplastic and optionally further comprising filler, reinforcing fiber, fibrous structure, or combinations of two or more thereof; wherein the thermoset includes an epoxy resin, a phenolic resin, or combinations thereof; and optionally the composition is a cured composition.

11. An article comprising a composition which comprises or is produced from
   an ethylene copolymer, a curing agent, an additive, and optionally an additional polymer wherein the ethylene copolymer is as recited in claim 1; the additive includes an antioxidant, an internal release agent, a scorch retarder, a plasticizer, an accelerator, a filler, or combinations of two or more thereof; the additional polymer includes an ethylene alkyl acrylate copolymer, a polyacrylate copolymer, or combinations thereof; and the article includes constant velocity joint boots, I-shaft boots, half-shaft boots, spark plug boots, hoses, seals, gaskets, dampers, belts, or ignition wire jacketing; or
   an ethylene copolymer, a curing agent, a second polymer, and optionally an additive wherein the ethylene copolymer as recited in claim 1; the second polymer includes a thermoset, a thermoplastic, or combinations thereof; the thermoset includes an epoxy resin, a phenolic resin, or combinations of two or more thereof; the additive includes filler, reinforcing fiber, fibrous structure, or combinations of two or more thereof; and the article includes printed circuit board, brake pad, or clutch facing.

12. The article of claim 11 wherein the acid cure site of the ethylene copolymer is methyl hydrogen maleate, ethyl hydrogen maleate, propyl hydrogen maleate, butyl hydrogen maleate, or combinations of two or more thereof.

13. The article of claim 11 wherein the ethylene copolymer is derived from about 1 to about 3 weight % of the acid cure site monomer or its derivative and has a polydispersity from about 2 to about 5.5.

14. A process comprising contacting ethylene and methyl acrylate with an acid cure site monomer under a condition effective to produce an ethylene copolymer, wherein the ethylene copolymer is as recited claim 1 and the condition includes a temperature from 120° C. to 185° C., a pressure from 1900 to 2810 kg/cm$^2$, and a feed temperature from 30° C. to 90° C.

15. The process of claim 14 wherein the acid cure site monomer is methyl hydrogen maleate, ethyl hydrogen maleate, propyl hydrogen maleate, butyl hydrogen maleate, or combinations of two or more thereof; the temperature is from 140° C. to 165° C.; the pressure is from 2065 to 2810 kg/cm$^2$; and the feed temperature is from 50° C. to 90° C.

16. The process of claim 14 further comprising combining the ethylene copolymer with a curing agent, an additive, or an additional polymer, or combinations of two or more thereof to produce a compounded composition; optionally forming the compounded composition into a desired shape; and concurrently or sequentially curing and optionally post curing the compounded composition wherein the additive includes an antioxidant, an internal release agent, a scorch retarder, a plasticizer, an accelerator, or a filler, or combinations of two or more thereof; the additional polymer includes ethylene alkyl acrylate copolymer, a polyacrylate copolymer, or combinations thereof; and the article includes ignition wire jacketing, hoses, dampers, seals, gaskets, belts, spark plug boots, constant velocity joint boots, or shaft boots.

17. The process of claim 16 wherein the acid cure site monomer is methyl hydrogen maleate, ethyl hydrogen maleate, propyl hydrogen maleate, butyl hydrogen maleate, or combinations of two or more thereof the temperature is from 140° C. to 165° C.; the pressure is from 2065 to 2810 kg/cm$^2$; and the feed temperature is from 50° C. to 90° C.

18. The process of claim 14 further comprising combining the ethylene copolymer with a curing agent, a second polymer, an additive, or combinations of two or more thereof to produce a composition; fabricating the composition into an article; and curing the article wherein the second polymer includes thermoset or a thermoplastic;
the thermoset includes an epoxy resin, a phenolic resin, or combinations thereof;
the additive includes filler, reinforcing fiber, fibrous structure, or combinations of two or more thereof;
the article includes printed circuit board, brake pad, or clutch facing; and
the fabricating includes coating, laminating, molding, extruding, filament winding, calendering, or combinations of two or more thereof.

19. The process of claim 18 wherein the acid cure site monomer is methyl hydrogen maleate, ethyl hydrogen maleate, propyl hydrogen maleate, butyl hydrogen maleate, or combinations of two or more thereof; the temperature is from 140° C. to 165° C.; the pressure is from 2065 to 2810 kg/cm$^2$; and the feed temperature is from 50° C. to 90° C.

* * * * *

UNITED STATES PATENT AND TRADEMARK OFFICE
CERTIFICATE OF CORRECTION

PATENT NO.         : 7,608,675 B2                                                   Page 1 of 1
APPLICATION NO. : 11/479039
DATED              : October 27, 2009
INVENTOR(S)        : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Twelfth Day of October, 2010

David J. Kappos
*Director of the United States Patent and Trademark Office*